June 19, 1923.
P. A. MICHELL
VEHICLE
Filed April 21, 1921
1,459,545
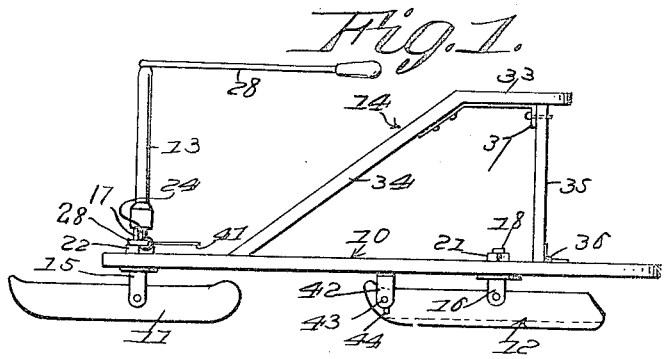
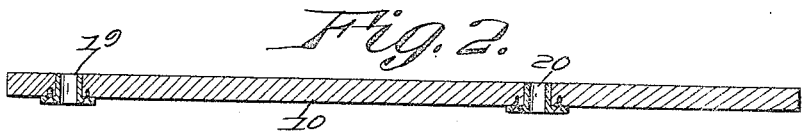
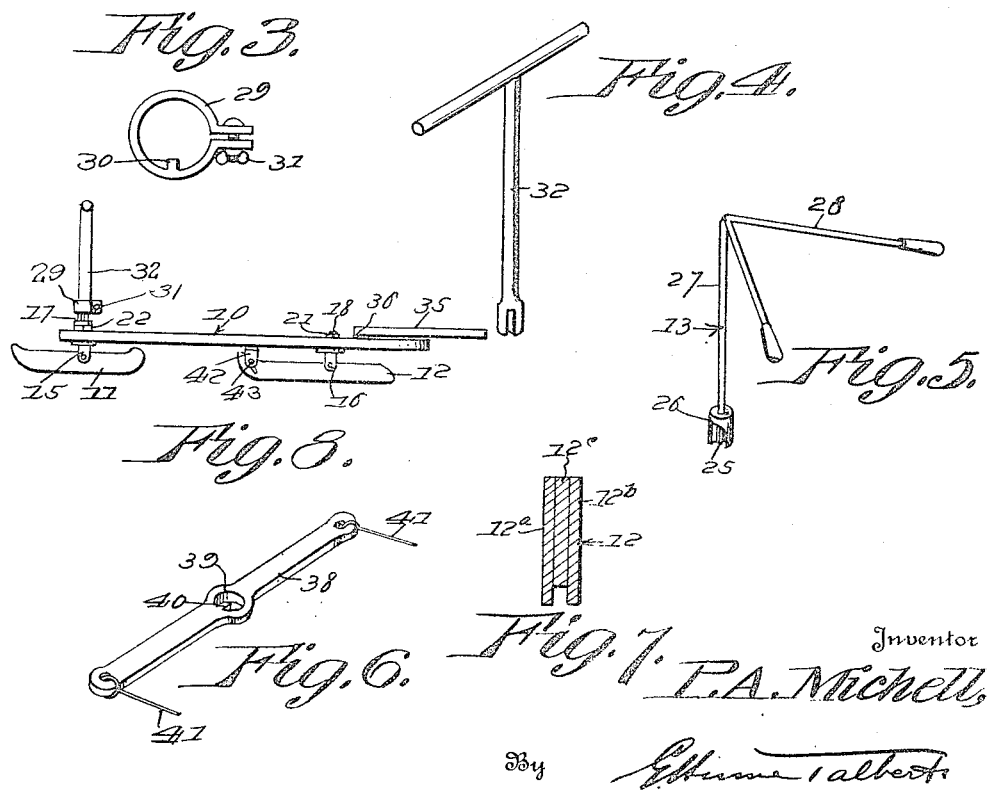
Inventor
P. A. Michell
By Etienne Talbert
Attorney Patented June 19, 1923.

1,459,545

UNITED STATES PATENT OFFICE.

PHILIP A. MICHELL, OF FORT WADSWORTH, NEW YORK.

VEHICLE.

Application filed April 21, 1921. Serial No. 463,303.

*To all whom it may concern:*

Be it known that PHILIP A. MICHELL, a citizen of the United States of America, residing at Fort Wadsworth, in the county of Richmond and State of New York, has invented new and useful Improvements in Vehicles, of which the following is a specification.

The object of the invention is to provide a pleasure or toy vehicle or skee-mobile which while particularly adapted and designed for operating on snow and ice may by the substitution of ordinary means of support be converted into a vehicle for traversing other surfaces either in coasting or otherwise and which by reason of simplicity of construction is adapted for juvenile use and for propulsion by "skipping"; and with this object in view the invention consists in a construction and combination of parts of which a preferred embodiment is shown in the accompanying drawings, wherein:—

Figure 1 is a side view of a vehicle embodying the invention.

Figure 2 is a detail sectional view of the platform or base of the same.

Figure 3 is a detail view of a collar adapted for attachment of a steering arm.

Figure 4 is a detail view of a steering arm adapted for use interchangeably with that shown in Figure 1.

Figure 5 is a detail view of the steering arm shown in Figure 1.

Figure 6 is a view of a steering bar also adapted for interchangeable use with the steering arm shown in Figure 1 and designed more particularly for coasting purposes.

Figure 7 is a detail sectional view of the rear runner.

Figure 8 is a view showing the device with the seat removed and the standard therefor in its folded posititon.

The vehicle consists essentially of a platform or base 10, front and rear runners 11 and 12, a steering member 13 and a seat 14.

The runners are pivotally carried at intermediate points by hangers 15 and 16, consisting of yokes having stems 17 and 18 mounted in bearings 19 and 20 in the platform or base, the stem of the rear hanger being engaged by a nut 21 and that of the front hanger being fitted with a collar 22 and being extended to form a stud 23 for the interchangeable attachment of steering means. This stud is preferably provided with a keyway 24 for engagement by a key 25 in a socket 26 formed at the lower end of a steering bar 27 carrying a handle 28 as shown in Figure 1. In Figure 3, however, there is shown a collar 29 of the split ring type having a key 30 adapted to be fitted upon the stud 23 and secured by means of a thumb bolt 31 to form the means of attachment of a pivotal steering handle 32 shown in Figure 4 as when the occupant of the vehicle desires to maintain a standing position as in skating or coasting. The steering bar or handle 28 shown in Figure 1 is preferably used in connection with a seat 33 having a downwardly and forwardly extending brace 34 resting upon the upper surface of the base or platform and supported at its rear end by the standard 35 hinged as at 36 to the base and attached at its upper end to the seat by means of a clip 37. When the seat is not required it may be removed and the standard may be folded to the position indicated in Figure 8.

It is also possible with the mechanism to employ a further interchangeable steering means consisting of a bar 38 shown in detail in Figure 6 and having a central opening 39 to receive the stud 23, said opening having a key 40 for engaging the keyway in the stud, and cords or ropes 41 being extended rearwardly from the extremities thereof to be grasped in the hands of the operator occupying a reclining position on the base or platform as when coasting.

The rear runner is preferably of transverse sectional construction as indicated in Figure 7, comprising the side plates 12$^a$ and 12$^b$ and an intermediate filler 12$^c$, the lower spaced edges of the members 12$^a$ and 12$^b$ being extended to form runner edges to minimize friction with the supporting surface.

The rear runner is pivotally mounted as is the front runner in the supporting hanger or yoke, and the front end thereof is engaged by a guiding yoke 42 having a pin 43 which passes through a vertical slot 44 in the runner. Thus the rear runner has a limited rocking movement and at the same time a limited lateral swinging movement by reason of the revoluble mounting of the stem 18 in the bearing 20. The front runner has a rocking movement adapting it to follow irregularities in the surface traversed and is adapted to be guided laterally to steer the vehicle by means of the handle bar of one or the other of the interchangeable forms indicated.

Having described the invention, what is claimed as new and useful is:—

A vehicle of the type indicated having a base, front and rear supporting members provided with hangers mounted upon the base, the hanger of the front supporting member being swiveled in the base and having an upwardly extending stud, a steering member mounted on said stud, the steering member and the stud being provided with keyways, and a split collar disposed in surrounding relation to the connecting ends of the stud and steering member and having a key engaging in said keyways.

In testimony whereof he affixes his signature.

PHILIP A. MICHELL.